(12) United States Patent
Li et al.

(10) Patent No.: US 12,539,985 B2
(45) Date of Patent: Feb. 3, 2026

(54) ARM ASSEMBLY AND UNMANNED AERIAL VEHICLE THEREOF

(71) Applicant: AUTEL ROBOTICS CO., LTD., Shenzhen (CN)

(72) Inventors: Xiaode Li, Guangdong (CN); Liang Hao, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/396,202

(22) Filed: Dec. 26, 2023

(65) Prior Publication Data

US 2024/0208677 A1    Jun. 27, 2024

(30) Foreign Application Priority Data

Dec. 23, 2022   (CN) .......................... 202223490118.6

(51) Int. Cl.
    *B64U 30/293*        (2023.01)

(52) U.S. Cl.
    CPC .................................. *B64U 30/293* (2023.01)

(58) Field of Classification Search
    CPC ........ B64U 30/293; B64U 10/14; B64C 39/02
    See application file for complete search history.

(56) References Cited

U.S. PATENT DOCUMENTS

| | | | | |
|---|---|---|---|---|
| 3,592,505 | A * | 7/1971 | Paine ....................... | B64G 1/60 |
| | | | | 285/410 |
| 4,763,459 | A * | 8/1988 | Wesselski .............. | B64G 99/00 |
| | | | | 403/171 |
| 10,870,477 | B1 * | 12/2020 | Nilson ................... | B64U 10/14 |
| 2020/0164957 | A1 * | 5/2020 | Xu ......................... | B64D 45/00 |
| 2021/0214068 | A1 * | 7/2021 | Bry ........................ | B64D 47/08 |

FOREIGN PATENT DOCUMENTS

| | | | | |
|---|---|---|---|---|
| CA | | 2997790 A1 * | 11/2014 | ............. B64C 27/08 |
| CN | | 105366041 A * | 3/2016 | ........... B64C 27/001 |

* cited by examiner

*Primary Examiner* — Joshua D Huson
*Assistant Examiner* — Peter A Taraschi

(57) ABSTRACT

Embodiments of the present disclosure relate to an arm assembly and an unmanned aerial vehicle thereof. The arm assembly includes: an arm support; an arm, where the arm is movably connected to the arm support, and is rotatable in a first direction and an opposite second direction; a locking member, where the locking member is disposed in the arm support, and is capable of abutting against or separating from the arm; and a connecting rod, where the connecting rod is connected between the locking member and the arm support, to associate rotation of the connecting rod with reciprocation of the locking member, when the locking member abuts against the arm, rotation of the arm in the first direction is capable of being restricted; and the locking member is separable from the arm driven by the rotation of the connecting rod, to release the restriction on the rotation of the arm.

9 Claims, 6 Drawing Sheets

ARM ASSEMBLY AND UNMANNED AERIAL VEHICLE THEREOF

CROSS REFERENCE TO RELATED DISCLOSURE

This application claims the benefit of and priority to Chinese patent application 202223490118.6, filed on Dec. 23, 2022, titled "Arm assembly and unmanned aerial vehicle thereof," the entirety of which is hereby incorporated herein by reference.

BACKGROUND

With the ongoing development of technologies, quadcopter unmanned aerial vehicles and other similar unmanned aerial vehicles start to be widely applied to people's daily production and life, bringing users a lot of convenience. Structural sizes of many unmanned aerial vehicles are designed to be increasingly larger, so as to provide users with heavier payload to improve and enrich functions of unmanned aerial vehicles.

To facilitate the carrying and transportation of an unmanned aerial vehicle, arms of the unmanned aerial vehicle are designed to be a foldable structure. Through switching between a folded state and an unfolded state, a spatial size occupied by the unmanned aerial vehicle during the carrying and transportation is significantly reduced.

Such a movable arm structure usually needs to use a complex locking mechanism to ensure that the arm structure can be locked in an unfolded state during normal flight. However, the complex locking mechanism adversely affects the folding of arms. For example, operation steps of folding are complex, which is not conducive to operations of users.

SUMMARY

The present application relates to the field of unmanned aerial vehicle technologies, and in particular, to an arm assembly and an unmanned aerial vehicle thereof. An arm assembly and an unmanned aerial vehicle provided in the present disclosure can overcome the problem of complex operations of folding a foldable arm structure.

According to a first aspect, an implementation of the present disclosure provides an arm assembly. The arm assembly includes: an arm support; an arm, where the arm is movably connected to the arm support, and is rotatable in a first direction and an opposite second direction; a locking member, where the locking member is disposed in the arm support, and is capable of abutting against or separating from the arm; and a connecting rod, where the connecting rod is connected between the locking member and the arm support, to associate rotation of the connecting rod with reciprocation of the locking member, where when the locking member abuts against the arm, rotation of the arm in the first direction is capable of being restricted; and the locking member is separable from the arm driven by the rotation of the connecting rod, to release the restriction on the rotation of the arm.

According to a second aspect, an implementation of the present disclosure provides an unmanned aerial vehicle. The unmanned aerial vehicle includes: a vehicle body; and a plurality of arm assemblies in the foregoing, where arm supports of the arm assemblies are fixed on the vehicle body.

At least one beneficial aspect of the arm assembly and the unmanned aerial vehicle provided in the embodiments of the present disclosure is as follows: Through the linkage between a rotatable connecting rod and a reciprocating locking member, in one aspect, automatic locking of arms by a locking member can be implemented, and in another aspect, a user can conveniently toggle the connecting rod to release the locking of the arms by the locking member, thereby effectively simplifying operation steps of unlocking.

BRIEF DESCRIPTION OF THE DRAWINGS

One or more embodiments are exemplarily described with reference to the corresponding accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

The present disclosure is described below in detail with reference to specific embodiments, and it should be emphasized that the following description is merely exemplary and is not intended to limit the scope of the present disclosure and its disclosures.

It needs to be noted that unless otherwise explicitly specified and limited, In the description of this specification, orientation or position relationships indicated by the terms such as "center", "longitudinal", "transverse", "up", "down", "vertical", "horizontal", "inside", and "outside" are based on orientation or position relationships shown in the accompanying drawings, and are used only for ease and brevity of illustration and description of the present disclosure, rather than indicating or implying that the mentioned apparatus or component must have a particular orientation or must be constructed and operated in a particular orientation. Therefore, such terms should not be construed as limiting of the present disclosure. Terms such as "mounted", "interconnected", "connected", and "fixed" shall be understood in a broad sense, for example, may be a fixing connection, a detachable connection, an integral connection, a mechanical connection, an electrical connection, a direct connection, an indirect connection by using an intermediate medium. In addition, terms "first" and "second" are used merely for the purpose of description, and shall not be construed as indicating or implying relative importance or implying a quantity of indicated technical features. Therefore, a feature limited by "first" or "second" may explicitly or implicitly include one or more of the features. "A plurality of" means two or more than two. "And/or" includes any or all combinations of one or more related listed items. A person of ordinary skill in the art may understand the specific meanings of the foregoing terms in the present disclosure according to specific situations.

Figure 1:
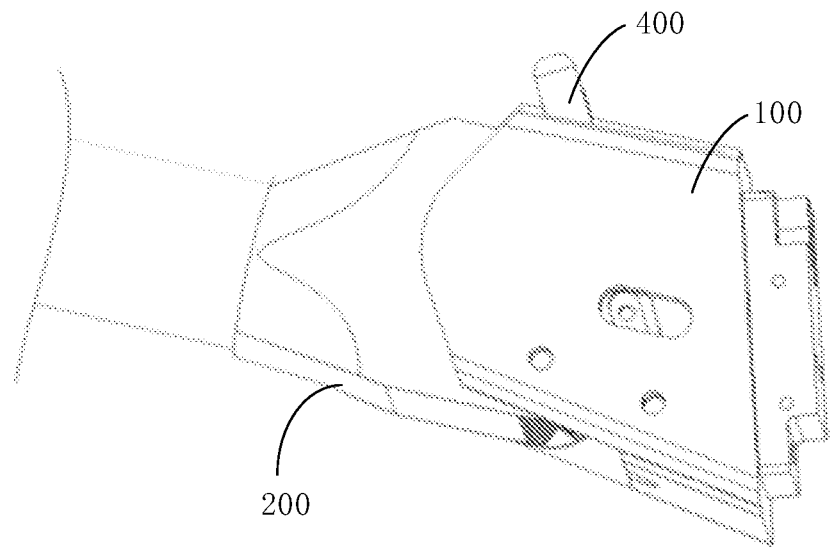
FIG. 1 is a schematic diagram of an arm assembly according to an embodiment of the present disclosure, showing a case of an unfolded state.
Figure 2:
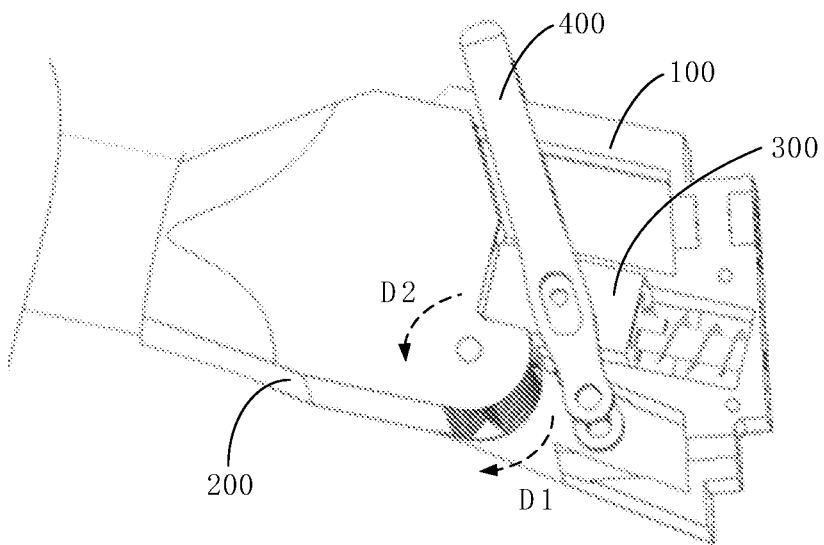
FIG. 2 is a schematic diagram of an arm assembly according to an embodiment of the present disclosure, showing a case of part of an arm support being removed.

FIG. 1 is a schematic diagram of an arm assembly according to an embodiment of the present disclosure. FIG. 2 is a schematic diagram of the arm assembly shown in FIG. 1 with part of the arm support being removed. As shown in FIG. 1 and FIG. 2, the arm assembly may include an arm support 100, an arm 200, a locking member 300 and a connecting rod 400.

The arm support 100 is a fixed base part. The arm support may be mounted and fixed on an unmanned aerial vehicle or a movement vehicle of another type, to enable the arm 200 to generate a change in a relative position from the movement vehicle. A shape or a size of any appropriate type may be selected and disposed for the arm support 100 according to a requirement of an actual case. This is not specifically limited herein.

The arm 200 is a movably part in the arm assembly. The arm is movably connected to the arm support 100 by a rotating shaft or in another similar manner, and is rotatable in a first direction and an opposite second direction. For example, as shown in FIG. 2, the arm 200 may be connected to the arm support 100 by the rotating shaft. The arm 200 can rotate around the rotating shaft in a clockwise direction D1 or counterclockwise direction D2 relative to the arm support 100.

In some embodiments, through a change in a position of the arm 200 relative to the arm support 100, the arm assembly may be enabled to switch between an unfolded state and a folded state, to reduce a spatial size occupied by the unmanned aerial vehicle during carrying. In this embodiment, for simple description, when the arm assembly is switched from the unfolded state to the folded state, a rotation direction of the arm 200 relative to the arm support 100 is referred to as the first direction (for example, the counterclockwise direction D2 shown in FIG. 2). When the arm assembly is switched from the folded state to the unfolded state, a rotation direction of the arm 200 relative to the arm support 100 is referred to as the second direction (for example, the clockwise direction D1 shown in FIG. 2).

The locking member 300 is a movable member that is disposed in the arm support 100 and is capable of abutting against or separating from the arm. In this embodiment, to facilitate description of a movement trajectory of the locking member 300, a term like "first position" is adopted to represent a position of the locking member when abutting against the arm, and a term like "second position" is adopted to represent a position of the locking member when separating from the arm. In other words, the foregoing "first position" refers to a position of the locking member 300 when abutting against the arm to restrict rotation of the arm 200 in the first direction, and the foregoing "second position" refers to a position of the locking member 300 when separating from the arm 200 to release the restriction on the rotation of the arm 200 in the first direction.

The connecting rod 400 is connected between the locking member 300 and the arm support 100. The connecting rod 400 is used as a transmission mechanism and can associate rotation of the connecting rod 400 and reciprocation of the locking member 300. In this embodiment, a term like "associate" is used to describe a linkage relationship between the connecting rod and the locking member.

In other words, the reciprocation of the locking member 300 between the first position and the second position can drive the connecting rod 400 to rotate correspondingly. Conversely, the rotation of the connecting rod 400 may also drive the corresponding locking member 300 to reciprocate.

as shown in FIG. 2, when the arm 200 rotates in the second direction to an angle corresponding to the unfolded state, the locking member 300 abuts against the arm 200, to restrict rotation of the arm 200 in the first direction. In this way, automatic locking of the arm 200 is implemented. When it is necessary to unlock the arm, the user may toggle the connecting rod 400 to make the connecting rod 400 rotate, so as to drive the locking member 300 to separate from the arm 200, thereby releasing the rotation restriction of the arm 200.

The arm assembly provided in the embodiments of the present disclosure has a self-locking function, and the restriction on the rotation of the arm by the locking member 300 can be conveniently released by toggling the connecting rod 400. The entire unlocking operation process is simple and convenient, which is beneficial to improving the user's experience.

Figure 3:
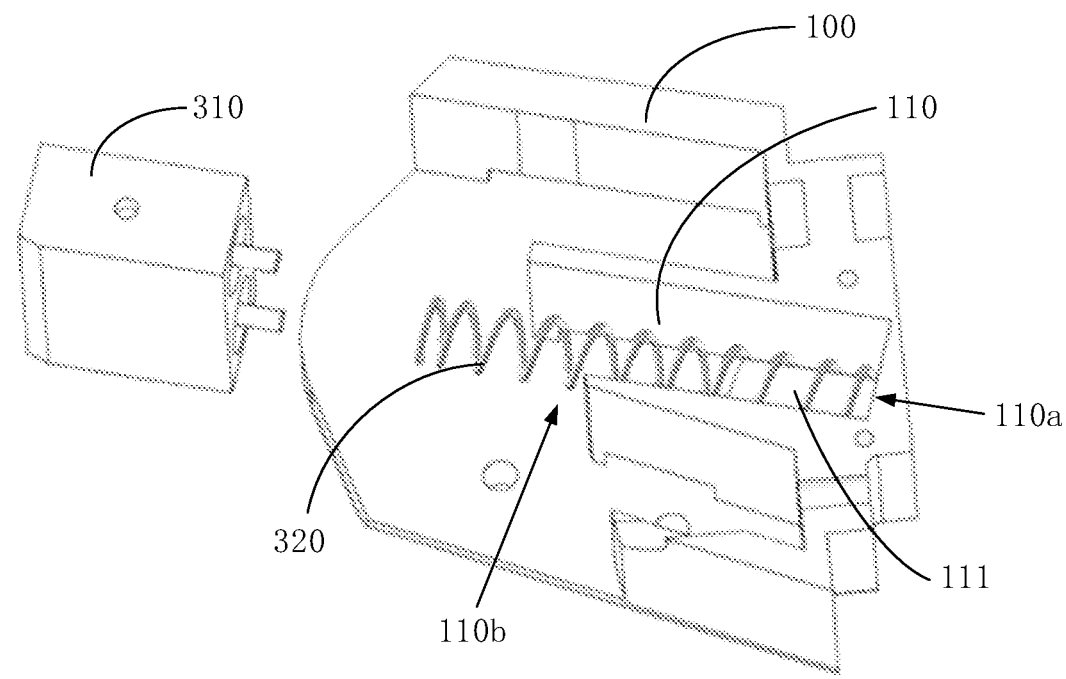
FIG. 3 is a schematic diagram of a locking member according to an embodiment of the present disclosure, showing an assembly relationship between a locking member and an arm support.

In some embodiments, as shown in FIG. 3, the foregoing locking member 300 may include a slider 310 and an elastic member 320. Adaptively, a chute 110 is opened in the arm support 100.

The slider 310 is accommodated inside the chute 110, and can reciprocate in an extension direction of the chute 110 under the guidance of the chute 110. The foregoing position of abutting against the arm and the foregoing position of separating from the arm are different positions of the slider 310 in the chute.

The elastic member 320 is a member that is connected between the slider 310 and the arm support 100 and is used for applying an elastic force. The elastic member may specifically apply an elastic force in a manner of any appropriate type, for example, a propping compression spring, or a tension spring. In this embodiment, the elastic force is a force that can drive the slider 310 to abut against the arm 200. In other words, under the action of the elastic force of the elastic member 320, the slider 310 has the tendency to automatic reset to abut against the arm 200.

Specifically, continuing to refer to FIG. 3, the foregoing elastic member 320 may be implemented by a compression spring. An end of the chute 110 away from the arm is disposed as a closed end 110a. Two ends of the compression spring respectively abut against the closed end 110a of the chute and the slider 310. In this way, through the tendency to restore an original state of the compression spring, the elastic force is applied to the slider 310. Preferably, to facilitate the assembly of the compression spring, corresponding structures may be respectively disposed for the slider 310 and the chute 110. For example, as shown in FIG. 3, a fixing post 111 with a certain length may be disposed at the closed end of the chute 110. A compression spring 320 is sleeved on the fixing post. A through hole adapting to the compression spring 320 may also be opened in the slider 310 and used for accommodating the compression spring.

A person skilled in the art may understand that the foregoing locking member is a stop member that can restrict rotation of the arm in the first direction at a specific position, and allow rotation of the arm in the opposite second direction. Based on the working principle of the locking member, a person skilled in the art may further correspondingly change, replace or adjust the foregoing locking member according to a requirement of an actual case. For example, a structure similar to a stop claw of a ratchet is adopted, to achieve a similar effect of preventing the arm from rotating in a reverse direction.

In some embodiments, continuing to refer to FIG. 3, an end of the chute 110 close to the arm 200 may be disposed as an open end 110b. In this way, at least part of the slider is exposed from the chute 110, and is in contact with the arm 200. In this embodiment, to facilitate simple description, the part of the slider 310 exposed from the chute 110 may be referred to as an exposed part.

Figure 4:
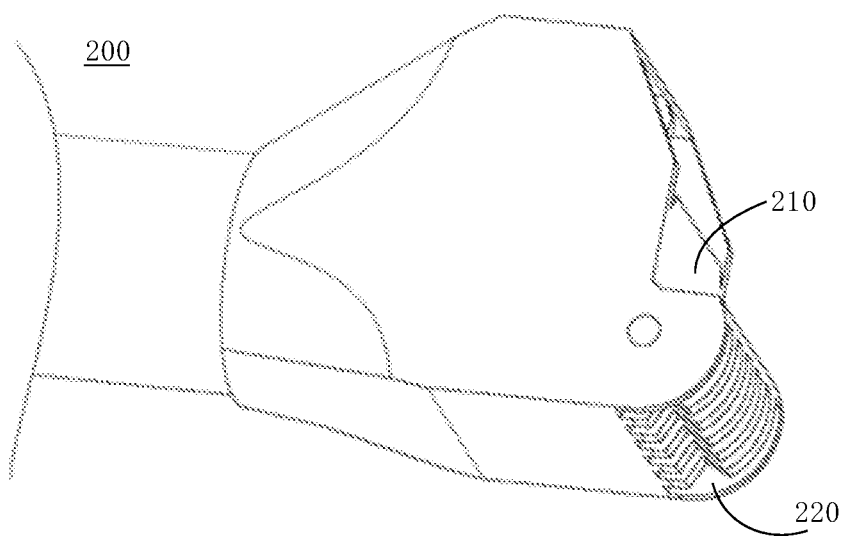
FIG. 4 is a schematic diagram of an arm according to an embodiment of the present disclosure, showing arrangement positions of a first concave portion and a second concave portion.

Correspondingly, as shown in FIG. 4, a first concave portion 210 is disposed at the arm 200 and is used for accommodating the exposed part of the slider 310. The first concave portion 210 may be specifically disposed as a structure adapting to the exposed part according to a requirement of an actual case, to allow the exposed part of the slider to be accommodated in the structure.

In some other embodiments, a second concave portion 220 may be further disposed on the foregoing arm 200. As shown in FIG. 4, the second concave portion 220 and the first concave portion 210 may be disposed in a rotational circumferential direction of the arm. The two are separated by a predetermined arc, so that when the arm assembly is in the folded state, at least part of the exposed part of the slider is accommodated in the second concave portion.

In the unfolded state, at least part of the exposed part of the slider 310 is accommodated in the first concave portion 210. In this case, restricted by the slider 310, the arm 200 cannot rotate in the first direction, to implement the locking of the arm. In the folded state, part of the exposed part of the slider 310 is accommodated in the second concave portion 220. In this case, the arm 200 may rotate in the second direction, and the second concave portion 220 accordingly pushes the slider 310 away from the position of abutting against the arm.

Figure 5:
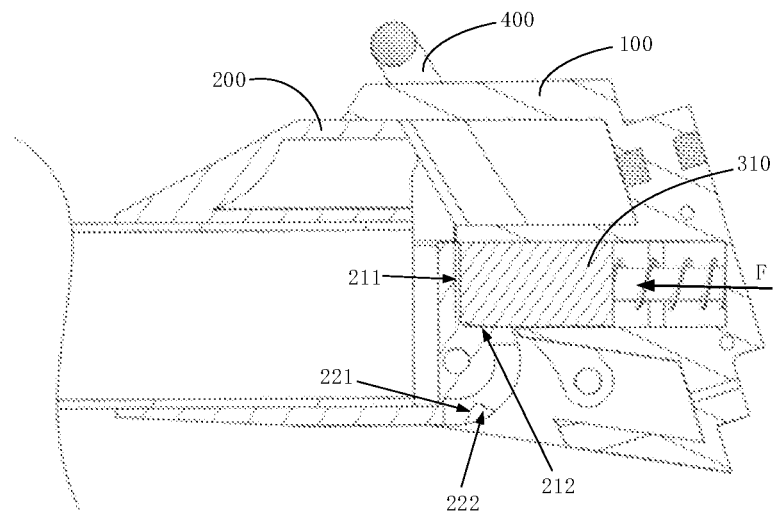
FIG. 5 is a cross-sectional view of an arm assembly according to an embodiment of the present disclosure, showing a case of an unfolded state.
Figure 6:
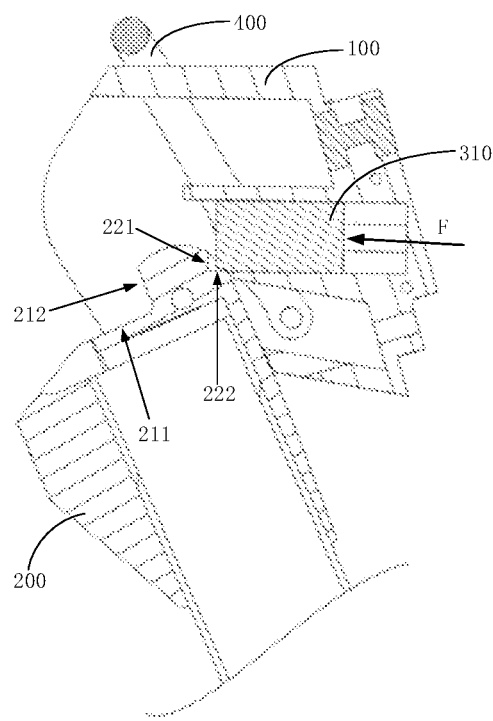
FIG. 6 is a cross-sectional view of an arm assembly according to an embodiment of the present disclosure, showing a case of a folded state.

Specifically, as shown in FIG. 5 and FIG. 6, the first concave portion 210 may have a first contact surface 211 and a second contact surface 212 that are at a preset angle. The second concave portion 220 has a third contact surface 221 and a fourth contact surface 222 that are at a preset angle.

The preset angle may be set according to a requirement of an actual case. For example, the present angle may be an angle of approximately 90°, to adapt to the slider 310 with a shape close to a square. Certainly, another angle may be selected or the shapes of the concave portions may be changed, provided that the concave portions can adapt to the exposed part of the slider 310.

As shown in FIG. 5, when the arm assembly is in the unfolded state, the second contact surface 212 of the first concave portion 210 is at an angle basically parallel to an elastic force F. In this way, when the arm 200 rotates around the first direction, a force applied by the arm to the slider cannot make the slider leave the position of abutting against the arm, and the rotation in the first direction is restricted by the slider. Alternatively, the second contact surface 212 may be at a certain angle with the elastic force F, provided that it is ensured that a component force formed on the inclined second contact surface is insufficient to overcome the elastic force F of the slider and cannot make the slider detach from the position of abutting against the arm. In this embodiment, the term "first angle range" is adopted to represent a range of an angle between the foregoing second contact surface and the elastic force.

As shown in FIG. 6, when the arm assembly is in the folded state, the third contact surface 221 of the second concave portion 220 is at an angle basically perpendicular to the elastic force F. In this way, when the arm 200 rotates in the first direction, the arm may apply a pressure to the slider, so as to drive the slider to leave the position of abutting against the arm, and move in a direction of separating from the arm. Alternatively, the third contact surface 221 may deviate from a vertical direction by a certain angle, provided that it is ensured that a component force formed on the inclined third contact surface 221 is sufficient to overcome the elastic force F of the slider and can push the slider away from the position of abutting against the arm. In this embodiment, the term "second angle range" is adopted to represent a range of an angle between the foregoing third contact surface and the elastic force.

Specifically, the first contact surface 211 of the first concave portion 210 and the third contact surface 221 of the second concave portion have similar structural arrangements and principles. For the similar structural arrangements and principles of the second contact surface 212 of the first concave portion 210 and the fourth contact surface 222 of the second concave portion, for simple description, details are not described herein again.

Figure 7:
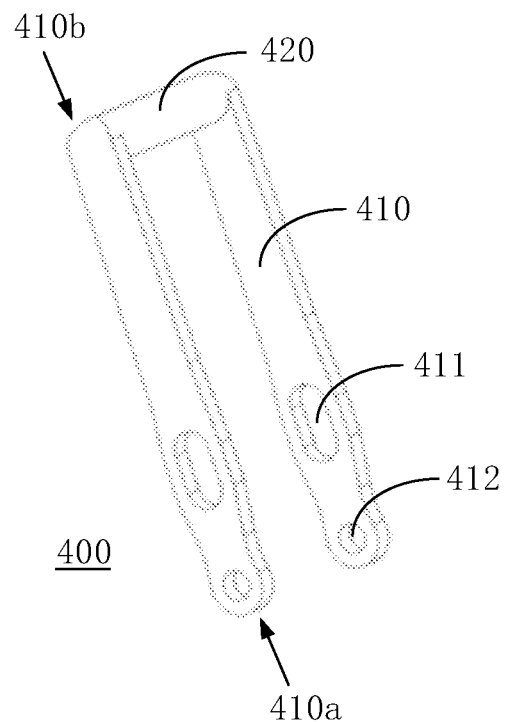
FIG. 7 is a schematic diagram of a connecting rod according to an embodiment of the present disclosure.

In some embodiments, as shown in FIG. 7, the connecting rod 400 may include a rod body 410 and a holding portion 420.

The rod body 410 may be formed by a pair of symmetrical strip-shaped structures. An appropriate gap exists between the two strip-shaped structures to allow the slider 310 to be placed between the strip-shaped structures. In this embodiment, two tail ends of the rod body 410 that are away from each other may be respectively referred to as a "first tail end 410a" and a "second tail end 410b".

Specifically, a slider connection hole 411 may be opened at a position between the first tail end 410a and the second tail end 410b of the rod body 410. A support connection hole 412 is opened in the first tail end 410a of the rod body 410.

Figure 8:
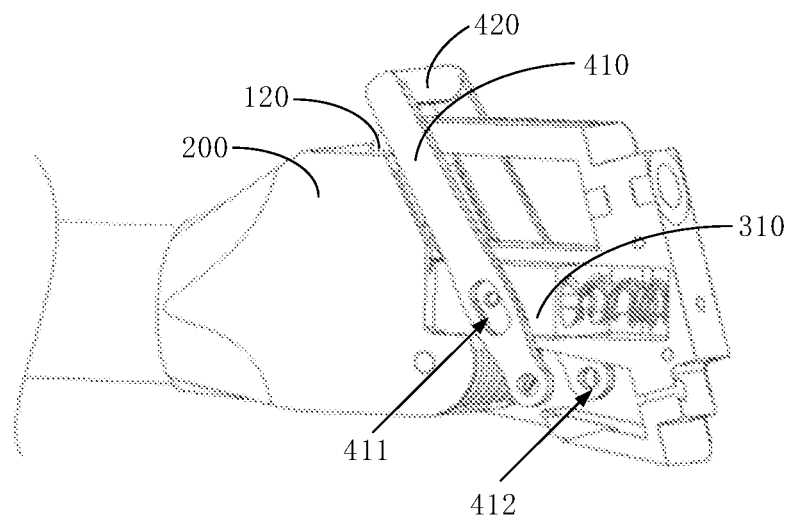
FIG. 8 is a schematic diagram of an arm assembly according to an embodiment of the present disclosure, showing an assembly relationship between a connecting rod and an arm support and a sliding block.

FIG. 8 shows an assembly position of the connecting rod. As shown in FIG. 8, the slider 310 may be movably connected to the rod body 410 through the slider connection hole 411, and the rod body 410 is movably connected to the arm support through the support connection hole 412, and is rotatable around the first tail end 410a. The rod body 410 has a large length, and the second tail end of the rod body and part of the rod body are exposed from the arm support 100.

The holding portion 420 is part located outside the arm support 100. The holding portion is connected between the pair of strip-shaped structures, and is located at the second tail end 410b of the rod body. In this way, a user may conveniently apply a force to the rod body 410 through the holding portion 420, to enable the rod body to rotate to drive the slider to move. Any appropriate shape or size, for example, a cylindrical shape shown in FIG. 7, may be specifically selected and disposed for the holding portion 420 according to a requirement of an actual case.

Figure 9:
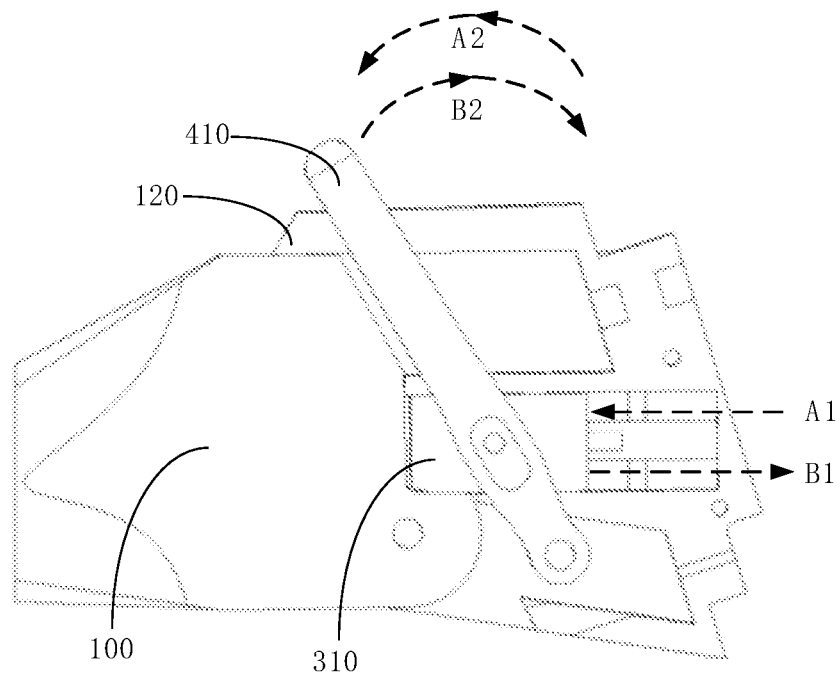
FIG. 9 is a schematic diagram of an arm assembly according to an embodiment of the present disclosure, showing a linkage relationship between a connecting rod and a sliding block.

During actual use, as shown in FIG. 9, when the slider 310 moves in a direction A1, the second tail end of the rod body 410 may be driven to rotate in a direction A2. When the second tail end of the rod body 410 rotates in a direction B2, the slider 310 may be correspondingly driven to move in a direction B1, and vice versa.

In this way, when needing to release the restriction on the rotation of the arm by the slider, the user may toggle the holding portion 420 to make the second tail end of the rod body rotate. In this way, the rotation of the rod body can drive the slider 310 to separate from the arm, thereby releasing the restriction on the rotation of the arm assembly 10.

Preferably, the slider connection hole 411 may be disposed at a position closer to the first tail end. Such a structural design may allow the user to use only a small force to toggle the connecting rod to overcome the elastic force applied by the elastic member.

In some embodiments, continuing to refer to FIG. 8 and FIG. 9, the arm support 100 may further include a limiting portion 120 located at a movement trajectory of the arm 200.

The "movement trajectory" refers to a path along which the arm 200 may pass in a process of rotating relative to the arm support. The limiting portion 120 may be disposed at an appropriate position or to have an appropriate size according to a requirement of an actual case, so that when the arm assembly is in the unfolded state, the limiting portion can abut against the arm 200, thereby achieving the effect of restricting the arm assembly 10 from continuing to rotate in the second direction.

During actual use, when the arm 200 rotates in the second direction to the angle corresponding to the unfolded state, in one aspect, the arm is blocked by the slider 310 that the arm abuts against, to restrict the arm from rotating in the first direction, and in another aspect, the arm is blocked by the limiting portion 120, to restrict the arm from continuing to rotate in the second direction. In this way, locking of the arm 200 is implemented.

Figure 10:
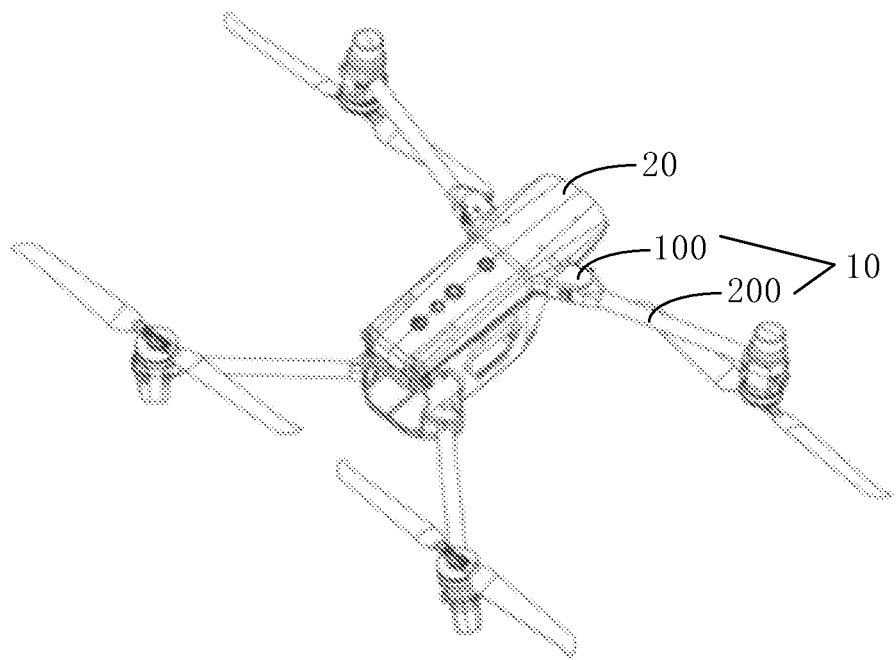
FIG. 10 is a schematic diagram of an unmanned aerial vehicle according to an embodiment of the present disclosure, showing a case of an unfolded state.
Figure 11:
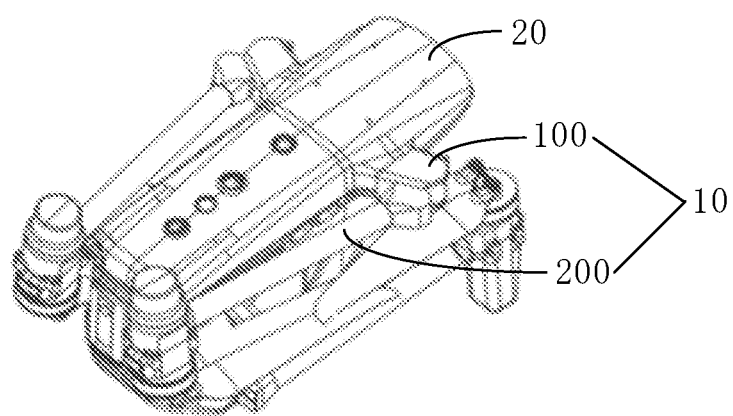
FIG. 11 is a schematic diagram of an unmanned aerial vehicle according to an embodiment of the present disclosure, showing a case of a folded state.

Based on the arm assembly provided in an embodiment of the present disclosure, the present disclosure further provides an unmanned aerial vehicle. FIG. 10 is a schematic diagram of an unmanned aerial vehicle in an unfolded state according to an embodiment of the present disclosure. FIG. 11 is a schematic diagram of an unmanned aerial vehicle in a folded state according to an embodiment of the present disclosure. As shown in FIG. 10 and FIG. 11, the unmanned aerial vehicle may include a plurality of arm assemblies 10 and a vehicle body 20.

In some embodiments, the arm assembly has a folded state and an unfolded state, where when the arm assembly is switched from the unfolded state to the folded state, a rotation direction of the arm relative to the arm support is the first direction; and when the arm assembly is switched from the folded state to the unfolded state, the rotation direction of the arm relative to the arm support is the second direction.

In some embodiments, a chute is opened in the arm support, the locking member including: a slider, where the slider is accommodated in the chute, and is reciprocated in an extension direction of the chute; and an elastic member, where the elastic member is connected between the slider and the arm support, and is used for applying an elastic force, where the elastic force is a force driving the slider to abut against the arm.

In some embodiments, an end of the chute away from the arm is a closed end, the elastic member being a compression spring, where one end of the compression spring abuts against the closed end of the chute and the other end of the compression spring abuts against the slider and is used for applying the elastic force to the slider.

In some embodiments, an end of the chute close to the arm is an open end, to expose at least part of the slider from the chute, a first concave portion being disposed on the arm, where when the arm assembly is in the unfolded state, at least part of the exposed part of the slider is accommodated in the first concave portion.

In some embodiments, a second concave portion is further disposed at the arm, the second concave portion and the first concave portion being disposed in a rotational circumferential direction of the arm, where when the arm assembly is in the folded state, at least part of the exposed part of the slider is accommodated in the second concave portion.

In some embodiments, the first concave portion has a first contact surface and a second contact surface that are at a preset angle and the second concave portion has a third contact surface and a fourth contact surface that are at a preset angle, where when the arm assembly is in the unfolded state, an angle between the second contact surface and the elastic force is within a preset first angle range, to enable the slider to remain abutting against the arm; and when the arm assembly is in the folded state, an angle between the third contact surface and the elastic force is within a preset second angle range, to enable the slider to overcome the elastic force and separate from the arm along with rotation of the arm in the second direction.

In some embodiments, the connecting rod includes: a rod body, where the rod body has a first tail end and a second tail end that are away from each other; and a holding portion, where the holding portion is formed by extending outward from the second tail end of the rod body, and is located outside the arm support, where the first tail end of the rod body is hinged to the arm support and a rod body middle between the first tail end and the second tail end of the rod body is hinged to the slider, to associate reciprocation of the slider with rotation of the second tail end of the rod body.

In some embodiments, the arm support further includes: a limiting portion, the limiting portion being disposed on a movement trajectory of the arm, where when the arm assembly is in the unfolded state, the limiting portion abuts against the arm, to restrict rotation of the arm in the second direction. An arm support of the arm assembly 10 is fixed on the vehicle body 20. The unmanned aerial vehicle may switch between an unfolded state and a folded state through a change in a relative position of the arm 200.

It should be noted that a quadcopter unmanned aerial vehicle is used as an example for description in the embodiments of the present disclosure. However, a person skilled in the art may further apply the foregoing arm assembly 10 to other movement vehicles of various different types according to a requirement of an actual case. This is not specifically limited herein.

The folded state and the unfolded state of the unmanned aerial vehicle in the embodiments of the present disclosure are described below in detail with reference to FIG. 10 and FIG. 11.

As shown in FIG. 11, in the folded state, the arm 200 is located at a position close to the vehicle body 20. In this case, as shown in FIG. 6, the slider 310 is located at the second position, and is connected to the second concave portion 220 of the arm 200. The user may apply an external force to the arm 200, to drive the arm to rotate in the second direction.

As shown in FIG. 11, in the unfolded state, the arm 200 is located at a position away from the vehicle body 20. In this case, as shown in FIG. 5, the slider 310 abuts against the arm, and is connected to the first concave portion 210 of the arm 200.

In one aspect, the second contact surface 212 of the first concave portion 210 is designed to make the slider 310 abut against the arm 200, to restrict the arm 200 from rotating in the first direction. In another aspect, the limiting portion 120 of the arm support 100 restricts the arm from continuing to rotate in the second direction. In this way, the arm 200 is automatically locked in the unfolded state, to ensure flight safety of the unmanned aerial vehicle during use.

When it is necessary to switch from the unfolded state to the folded state, the user may apply an external force to the holding portion 420 to enable the rod body 410 of the connecting rod to rotate, thereby driving the slider 310 to separate from the arm. As the slider 310 separates from the arm, restriction on the rotation of the arm 200 is released. In this case, the arm 200 may be correspondingly swayed, to enable the arm to rotate in the first direction to the folded state.

In summary, the arm assembly according to the embodiments of the present disclosure can automatically lock an arm in an unfolded state, and further use a specific design structure of a connecting rod and a locking member to assist a user in completing an unlocking operation in a simple and convenient manner and facilitate switching of the arm assembly between the unfolded state and a folded state, thereby effectively improving use experience of the user.

The foregoing contents are detailed descriptions of the present disclosure with reference to specific preferred embodiments, and it should not be considered that the specific implementation of the present disclosure is limited to these descriptions. For a person of ordinary skill in the art, several transformations and improvements can be made without departing from the idea of the present disclosure. These transformations and improvements belong to the protection scope of the present disclosure.

What is claimed is:

1. An unmanned aerial vehicle, comprising:
a vehicle body; and
a plurality of arm assemblies;
wherein arm supports of the arm assembly are fixed on the vehicle body; and
each of the plurality of arm assemblies includes:
an arm support,
an arm, wherein the arm is movably connected to the arm support, and is rotatable in a first direction and an opposite second direction,
a locking member, wherein the locking member is disposed in the arm support, and is reciprocates to abut against or separate from the arm, and
a connecting rod, wherein the connecting rod is connected between the locking member and the arm support and associates rotation of the connecting rod with reciprocation of the locking member, wherein the connecting rod has a first tail end and a second tail end that are away from each other, the first tail end of the connecting rod being movably connected to the arm support and the second tail end of the connecting rod extending outside the arm support and exposed for unobstructed access and engagement by a user; and
wherein
when the locking member abuts against the arm, rotation of the arm in the first direction is restricted, and when the connecting rod is actuated and rotated by a user pushing on the exposed second tail end of the connecting rod, the locking member is driven by the rotation of the connecting rod,
separates from the arm, and
releases the restriction on the rotation of the arm.

2. The unmanned aerial vehicle according to claim 1, wherein the arm assembly has a folded state and an unfolded state,
wherein when the arm assembly is switched from the unfolded state to the folded state, a rotation direction of the arm relative to the arm support is the first direction; and
when the arm assembly is switched from the folded state to the unfolded state, the rotation direction of the arm relative to the arm support is the second direction.

3. The unmanned aerial vehicle according to claim 2, wherein a chute is provided in the arm support, the locking member comprising:
a slider, wherein the slider is accommodated in the chute, and is reciprocate in an extension direction of the chute; and
an elastic member, wherein the elastic member is connected between the slider and the arm support, and is configured to apply an elastic force,
wherein the elastic force is a force driving the slider to abut against the arm.

4. The unmanned aerial vehicle according to claim 3, wherein an end of the chute away from the arm is a closed end, the elastic member being a compression spring,
wherein one end of the compression spring abuts against the closed end of the chute and the other end of the compression spring abuts against the slider and is configured to apply the elastic force to the slider.

5. The unmanned aerial vehicle according to claim 3, wherein an end of the chute close to the arm is an open end, to expose at least part of the slider from the chute, a first concave portion being disposed on the arm,
when the arm assembly is in the unfolded state, at least part of the exposed part of the slider is accommodated in the first concave portion.

6. The unmanned aerial vehicle according to claim 5, wherein a second concave portion is further disposed at the arm, the second concave portion and the first concave portion being disposed in a rotational circumferential direction of the arm,
when the arm assembly is in the folded state, at least part of the exposed part of the slider is accommodated in the second concave portion.

7. The unmanned aerial vehicle according to claim 6, wherein the first concave portion has a first contact surface and a second contact surface that are at a preset angle and the second concave portion has a third contact surface and a fourth contact surface that are at a preset angle,
when the arm assembly is in the unfolded state, an angle between the second contact surface and the elastic force is within a preset first angle range, to enable the slider to remain abutting against the arm; and
when the arm assembly is in the folded state, an angle between the third contact surface and the elastic force is within a preset second angle range, to enable the slider to overcome the elastic force and separate from the arm along with rotation of the arm in the second direction.

8. The unmanned aerial vehicle according to claim 3, wherein the connecting rod comprises:
a holding portion, wherein the holding portion is located at the second tail end of the connecting rod, wherein the slider is movably connected to the connecting rod, to associate reciprocation of the slider with rotation of the holding portion.

9. The unmanned aerial vehicle according to claim 2, wherein the arm support further comprises a limiting portion, the limiting portion being disposed on a movement trajectory of the arm, wherein when the arm assembly is in the unfolded state, the limiting portion abuts against the arm, to restrict rotation of the arm in the second direction.

* * * * *